(12) United States Patent
Rich

(10) Patent No.: US 11,907,387 B2
(45) Date of Patent: Feb. 20, 2024

(54) SERVICE FOR SHARING DATA INSIGHTS

(71) Applicant: Salesforce, Inc., San Francisco, CA (US)

(72) Inventor: Alexander Rich, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 447 days.

(21) Appl. No.: 17/225,005

(22) Filed: Apr. 7, 2021

(65) Prior Publication Data

US 2022/0327226 A1    Oct. 13, 2022

(51) Int. Cl.
  *G06F 21/62* (2013.01)
  *G06F 16/2458* (2019.01)
  *G06F 16/26* (2019.01)
  *G06Q 30/04* (2012.01)

(52) U.S. Cl.
  CPC ...... *G06F 21/6218* (2013.01); *G06F 16/2465* (2019.01); *G06F 16/26* (2019.01); *G06Q 30/04* (2013.01)

(58) Field of Classification Search
  CPC ......... G06F 2221/2141; G06F 21/6245; G06F 21/6218; G06F 16/26; G06F 16/2465; H04L 63/101; H04L 63/20; H04W 12/08; G06Q 30/04
  See application file for complete search history.

(56) References Cited

U.S. PATENT DOCUMENTS

| | | | |
|---|---|---|---|
| 7,730,478 B2 | 6/2010 | Weissman | |
| 11,068,244 B2 | 7/2021 | Rich et al. | |
| 11,604,799 B1* | 3/2023 | Bigdelu | G06F 3/0484 |
| 2009/0299853 A1* | 12/2009 | Jones | G06Q 30/0256 |
| | | | 707/999.005 |
| 2012/0239825 A1* | 9/2012 | Xia | G06F 9/44505 |
| | | | 709/250 |
| 2017/0318020 A1* | 11/2017 | Kamath | G06F 16/176 |
| 2018/0191781 A1* | 7/2018 | Palani | H04L 63/1441 |
| 2018/0197085 A1* | 7/2018 | Akkiraju | G06F 16/90335 |
| 2019/0108262 A1* | 4/2019 | Scolnick | G06F 16/2456 |

(Continued)

OTHER PUBLICATIONS

Li et al., "Enhancing Cloud-Based IoT Security Through Trustworthy Cloud Service: An Integration of Security and Reputation Approach," IEEE Access Year: 2019 | vol. 7 | Journal Article | Publisher: IEEE.*

(Continued)

*Primary Examiner* — Roderick Tolentino
(74) *Attorney, Agent, or Firm* — Nicholson, De Vos, Webster & Elliott, LLP; Daniel J. Lee

(57) ABSTRACT

A method by one or more computing devices implementing a data insights sharing service to allow a first user of the data insights sharing service to share data insights with other users of the data insights sharing service. The method includes storing metadata describing one or more data insights, where the one or more data insights were generated based on analyzing a dataset of the first user, responsive to receiving a request from a second user to access the one or more data insights, generating the one or more data insights based on the metadata describing the one or more data insights without accessing the dataset, and providing the one or more data insights to the second user via a graphical user interface (GUI) of the data insights sharing service.

20 Claims, 9 Drawing Sheets

(56) References Cited

U.S. PATENT DOCUMENTS

2019/0108291 A1* 4/2019 Spencer-Harper .... G06F 16/335
2020/0034481 A1* 1/2020 Asplund ................. G06F 16/35
2020/0104104 A1    4/2020 Rich et al.
2020/0104105 A1    4/2020 Rich et al.
2020/0210383 A1* 7/2020 Demaris ............... G06F 16/168

OTHER PUBLICATIONS

Lin et al., "A Sanitization Approach to Secure Shared Data in an IoT Environment," IEEE Access Year: 2019 | vol. 7 | Journal Article | Publisher: IEEE.*
Amazon Web Services, Inc., "Pre-trained machine learning models available in AWS Marketplace," copyright 2012-2021, downloaded from https://aws.amazon.com/marketplace/solutions/machine-learning/pre-trained-models on Apr. 7, 2021, 14 pages.
Salesforce.com, inc., "Introduction to Einstein Discovery," copyright 2000-2020, downloaded from https://help.salesforce.com/articleView?id=sf.bi_edd_about.htm&type=5 on Apr. 7, 2021, 3 pages.
Snowflake, "Snowflake data marketplace for data consumers," Solution Brief, copyright 2020, downloaded from https://resources.snowflake.com/solution-briefs/snowflake-data-marketplace-for-consumers?_ga=2.229558940.1088874885.1617832562-1713752384.1617832562 on Apr. 7, 2021, 2 pages.

* cited by examiner

THIS MODEL SUPPORTS PREDICTIONS    [🔘 14K REMAINING]

YOUR PREDICTION CONSUMPTION PLAN ALLOWS 40,000 PREDICTIONS PER MONTH.

EXPLORATION

PREDICT USING CSV UPLOAD

UPLOAD A CSV FILE FOLLOWING THE BELOW SPECIFICATIONS. YOU WILL BE PROMPTED (AND EMAILED) A RESULTING CSV FOLLOWING YOUR CHOICES BELOW.

PREDICT OVER REST API

ALLOWED CSV HEADERS

UPLOAD CSV

CONFIG_REQUESTS, SESSIONS, TEST_DRIVES, TOTAL_CONGIGS_FINISHED, KEEP_ME_UPDATED_COUNT

PAST CSV SCORING JOBS

RESULT CONFIGURATION

☐ INCLUDE TOP FACTORS
☐ INCLUDE RECOMMENDATIONS
☐ APPEND PREDICTION COLUMNS TO ORIGINAL CSV

INPUT CSV

[⬆ UPLOAD CSV]   OR DROP FILE

PREDICT

[START SCORING]

FIG. 5

SERVICE FOR SHARING DATA INSIGHTS

TECHNICAL FIELD

One or more implementations relate to the field of automated data analytics, and more specifically, to a data insights sharing service that allows users to share data insights with other users without exposing the datasets that were analyzed to generate those data insights.

BACKGROUND

A data analytics service may analyze a dataset on behalf of user, generate insights for the dataset based on the analysis, and provide the generated insights to the user. The insights may include, for example, information regarding patterns appearing in the dataset and/or statistical relationships between variables in the dataset. The insights may help the user understand the data better so that the user can understand its customers, industry, and/or competition better (e.g., if the user is a member of a business and the dataset includes data related to the business). The data analytics service may also generate one or more predictive models based on the analysis (e.g., using machine learning techniques) that can be used to make predictions on datasets not yet seen.

However, the data analytics service may not be able to generate meaningful insights and/or accurate predictive models if the user does not provide a sufficient quantity and quality of data for the data analytics service to analyze. Smaller-scale users (e.g., smaller businesses) might not have access to as much data as larger-scale users (e.g., larger businesses), and thus may not be able to provide sufficient quantity or quality of data to the data analytics service to allow the data analytics service to generate meaningful insights and/or accurate predictive models. While larger-scale users may be able to provide sufficient quantity and quality of data to the data analytics service to allow the data analytics service to generate meaningful insights and/or accurate predictive models, there is no way for these users to share the insights or predictive models with a broader audience such as their own customers, peers, or industry analysts in an organized/centralized and secure/private manner.

Data marketplaces (e.g., Snowflake® data marketplace) allow a user to share its datasets with other users. However, data marketplaces expose the user's raw data, which may be undesirable, particularly if the dataset includes sensitive/proprietary data.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2 is a diagram illustrating a graphical user interface (GUI) that allows a user to browse/search listings of the data insights sharing service, according to some example implementations.

FIG. 4 is a diagram illustrating a GUI that allows a user to provide a dataset to the data insights sharing service by selecting values for different columns/variables, according to some example implementations.

FIG. 5 is a diagram illustrating a GUI that allows a user to provide a dataset to the data insights sharing service by uploading a comma separated value (CSV) file, according to some example implementations.

DETAILED DESCRIPTION

The following description describes methods and apparatus to implement a data insights sharing service that allows users to share data insights with other users without exposing the datasets that were analyzed to generate those data insights. An implementation is a method by one or more computing devices implementing a data insights sharing service to allow a first user of the data insights sharing service to share data insights with other users of the data insights sharing service. The method includes storing metadata describing one or more data insights, wherein the one or more data insights were generated based on analyzing a dataset of the first user, receiving a request from a second user of the data insights sharing service to access the one or more data insights, responsive to receiving the request from the second user to access the one or more data insights, generating the one or more data insights based on the metadata describing the one or more data insights without accessing the dataset of the first user, and providing the one or more data insights to the second user via a graphical user interface (GUI) of the data insights sharing service. Additionally or alternatively, in some implementations, the data insights sharing service allows users to share predictive models with other users such that other users can apply the predictive models to their own datasets, but without exposing the predictive models themselves or the datasets that were analyzed to generate the predictive models to those other users.

An advantage of implementations disclosed herein is that they can provide a platform that allows users to share data insights for their datasets with other users without exposing the datasets themselves. Users may wish to share data insights to earn sales, accountability, and/or respectability in their industries. The ability to share insights while limiting the exposure of datasets may be particularly desirable if the datasets contain potentially sensitive or proprietary data. Also, an advantage of implementations disclosed herein is that they can provide a platform that allows users to share predictive models with other users (alternatively or in addition to providing the platform that allows users to share data insights) so that other users can apply the predictive models to their own datasets, but without exposing the predictive models themselves or the dataset that was analyzed to generate those predictive models. While certain advantages are mentioned here, one of ordinary skill in the art will recognize that implementations may provide other advantages than those mentioned above.

Figure 1:
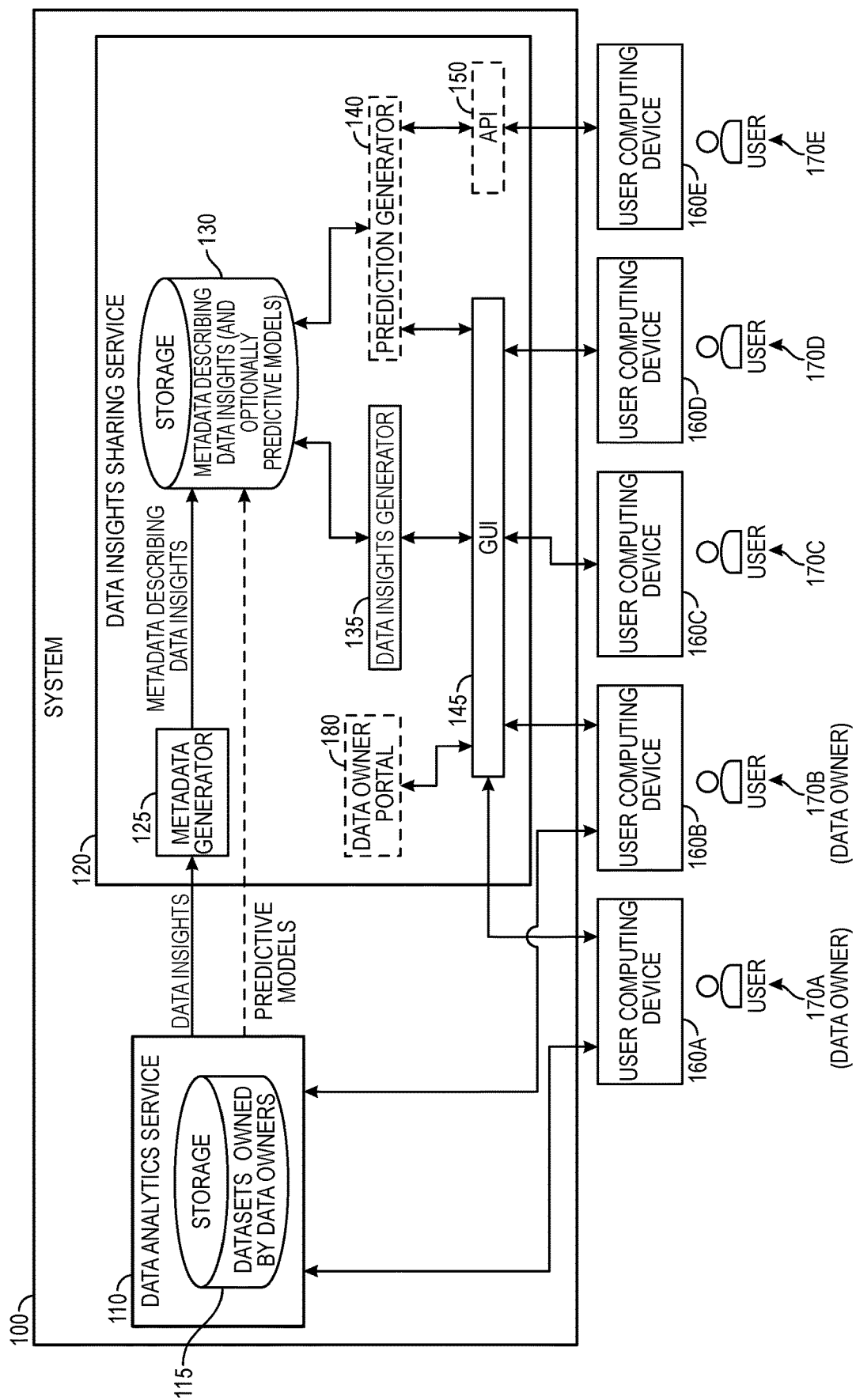
FIG. 1 is a block diagram of a system that implements a data insights sharing service, according to some example implementations.

FIG. 1 is a block diagram of a system that implements a data insights sharing service, according to some example implementations. As shown in the diagram, the system 100 implements a data analytics service 110 and a data insights sharing service 120. Users may operate their respective user computing devices to interact with the data analytics service 110 and/or the data insights sharing service 120 (e.g., via GUIs provided by the services). For example, as shown in the diagram, users 170A and 170B may operate their respective user computing devices 160A and 160B to interact with the data analytics service 110 and the data insights sharing service 120. In this sense, users 170A and 170B may be considered users of both the data analytics service 110 and the data insights sharing service 120. Also, users 170C-E may operate their respective user computing devices 160C-E to interact with the data insights sharing service 120. In this example, users 170C-E are users of the data insights sharing service 120 but may not necessarily be users of the data analytics service 110. User computing devices 160A-E may be any type of electronic device that users 170 can use to access services (e.g., hosted by a server/cloud) such as desktops, workstations, laptops, personal digital assistants, smartphones, wearables, augmented reality (AR) devices, virtual reality (VR) devices, mixed reality (MR) devices, or other type of electronic device providing similar functionality. Thus, the user computing devices 160 may be considered to be "clients" or "client devices." Each of the data analytics service 110 and the data insights sharing service 120 may be implemented using one or more server computing devices. For ease of description, users 170 will be described herein as interacting with services, which should be understood to mean that the users 170 operate their user computing devices 160 to interact with services (e.g., via GUIs provided by the services and/or application programming interfaces (APIs) provided by the services).

The data analytics service 110 may provide a service that analyzes datasets on behalf of users 170 and generates insights for those datasets based on the analysis. A user 170 may submit a request to the data analytics service 110 to analyze its dataset (e.g., via a GUI or API). The user 170 may provide the dataset to be analyzed to the data analytics service by uploading the dataset directly to the data analytics service 110 or providing a reference/link to the location of the dataset (e.g., a URL uniform resource locator (URL) or a database link) to the data analytics service 110. In an implementation, the data analytics service 110 includes a storage 115 for storing datasets uploaded/provided by users 170. In an implementation, storage 115 is a database (e.g., a relational database).

Responsive to receiving a request from a user 170 to analyze a dataset, the data analytics service 110 may analyze the dataset (e.g., using statistical models and/or machine learning techniques) and generate one or more insights for the dataset based on the analysis. The insights may include, for example, information regarding patterns appearing in the dataset and/or statistical relationships between variables in the dataset. Insights for a dataset may also be referred to herein as data insights for the dataset. The data analytics service 110 may provide the generated data insights for the dataset to the requesting user 170 (e.g., via a GUI or API).

In an implementation, the data analytics service 110 generates one or more predictive models based on analyzing the dataset (e.g., in addition to generating the data insights for the dataset). A predictive model is a model that can be used to predict the values of one or more outcome variables as a function of one or more input variables. In an implementation, predictive models are implemented as a JavaScript Object Notation (JSON) objects or as a collection of files, which when provided to a prediction generator 140, allows the prediction generator 140 to generate predictions for a dataset that has a similar shape/form as the original dataset that was analyzed to generate the predictive model. The data analytics service 110 may generate the predictive models using machine learning techniques. The data analytics service 110 may apply the predictive models to other datasets provided by the user 170 to make predictions on the other datasets and provide the predictions to the user 170.

The data insights (and possibly predictions) provided by the data analytics service may help the user 170 understand its dataset better, which may in turn help the user understand its customers, industry, and/or competition better, thereby providing a competitive advantage for the user 170 (e.g., if the user 170 is a member of a business and the dataset being analyzed includes data related to the business). The user 170 may wish to share the data insights with others such as the user's customers, peers, and/or industry analysts. However, as mentioned above, existing data analytics services do not allow users to share data insights with others in an organized/centralized and secure/private manner Sharing of Data Insights To help address one or more of the needs mentioned above, in an implementation, the data insights sharing service 120 provides a service that allows users to easily share data insights for their datasets with other users without exposing the datasets themselves. Once the data analytics service 110 generates data insights for a dataset owned by a user 170, the user 170 may submit a request to the data insights sharing service 120 to share these data insights with users of the data insights sharing service 120 (e.g., via a GUI 145). In an implementation, the request may include user-provided information regarding the data insights such as a brief description of the data insights and a pricing model for the data insights.

Responsive to receiving the request from the user to share data insights, the data insights sharing service 120 may pull the data insights from the data analytics service 110 (in some implementations the data analytics service 110 pushes/exports the data insights to the data insights sharing service 120 (e.g., upon detecting that a user has submitted a request to share the data insights)). A metadata generator 125 of the data insights sharing service 120 may obtain the data insights and generate metadata describing the data insights. The metadata describing the data insights may include information that can be used by a data insights generator 135 of the data insights sharing service 120 to generate the data insights without accessing the dataset that was analyzed to generate those data insights. For example, the metadata describing the data insights may include information regarding the number of rows analyzed, frequency of various values of various columns, and/or information about how an outcome performs with respect to various other variables. The performance of the outcome variable with respect to other variables may be separated into orders—for example first order insights may indicate how the outcome changes with one column while a second order insight may indicate the performance of the outcome column when two columns have two particular values. In addition to these data insights, the metadata may describe the statistical correlation between each column and the output column. The metadata generator 125 may store the metadata describing the data insights in storage 130 along with any user-provided information regarding the data insights. It should be noted that while the metadata describing the data insights is stored, the dataset that was analyzed to generate those data insights does not need to be stored.

The data insights sharing service 120 may then create a listing for the data insights that can be browsed/searched by users of the data insights sharing service 120. The listing may include a preview of the data insights being shared. The preview may include various information regarding the data insights such as the user-provided information regarding the data insights (e.g., a brief description of the data insights and a pricing model for the data insights) and possibly other information regarding the data insights. For example, the preview for data insights may indicate that the data insights explain the correlation between tire size, rubber quality, and miles per gallon, and that the data insight is 88 percent predictive (according to statistical tests that determine r-squared, chi-squared, etc.).

In an implementation, the data insights sharing service 120 performs an automatic tagging operation when new data insights are shared. For example, the data insights sharing service 120 may inspect the data insights and/or the dataset that was analyzed to generate those data insights to determine the quality of the data insights (e.g., how much data was analyzed to generate the data insights) and/or the subject matter of the data insights (e.g., by looking at column names included in the dataset). The data insights sharing service 120 may then tag the data insights with this information to allow users 170 to search/browse for data insight listings based on the automatically generated tags/information. In an implementation, if a user 170 that has previously shared data insights subsequently shares/publishes new versions of their data insights, the data insights sharing service 120 may automatically detect the changes between the different versions and provide this information to other users 170 of the data insights sharing service 120.

Figure 2:
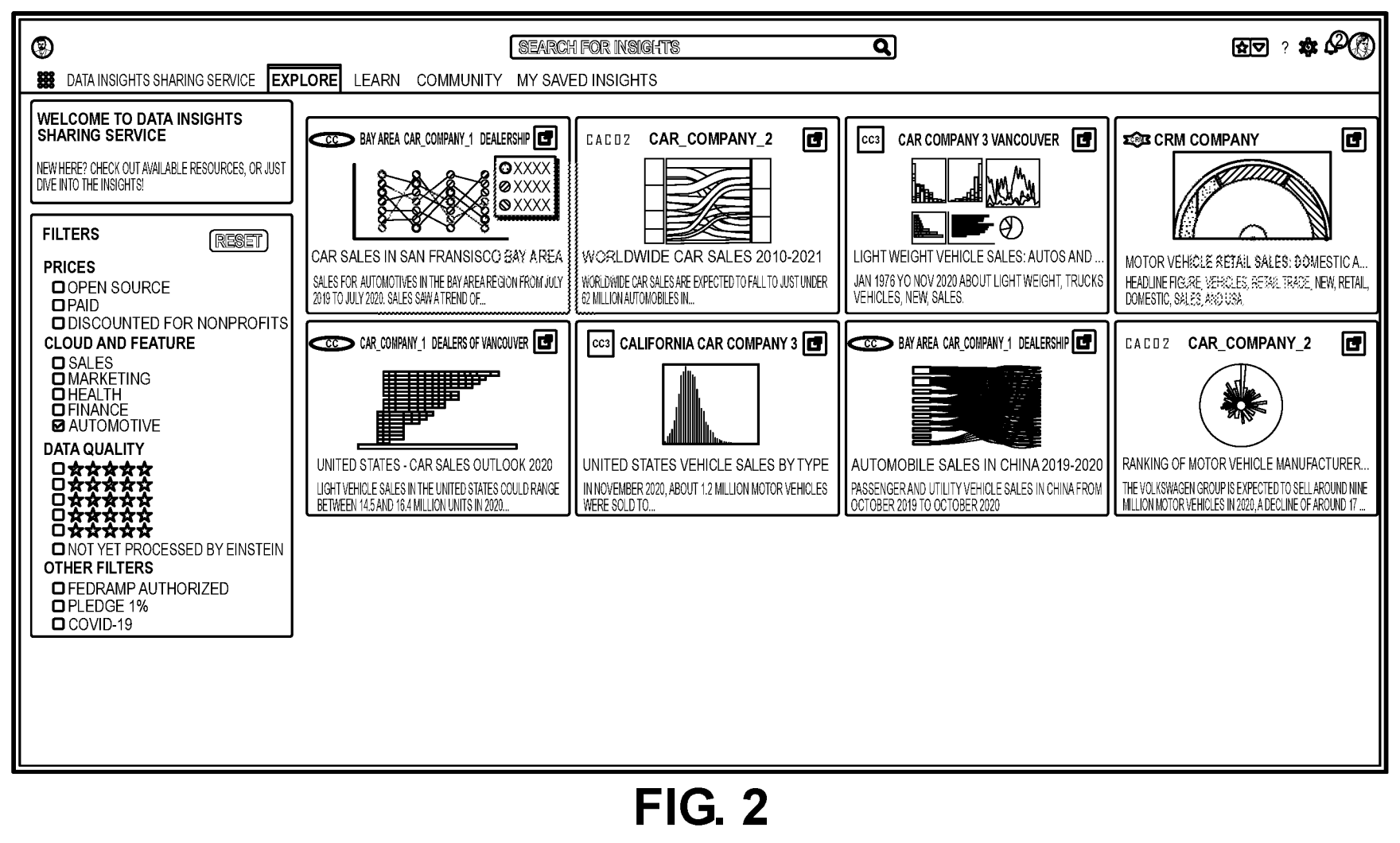
Figure 3:
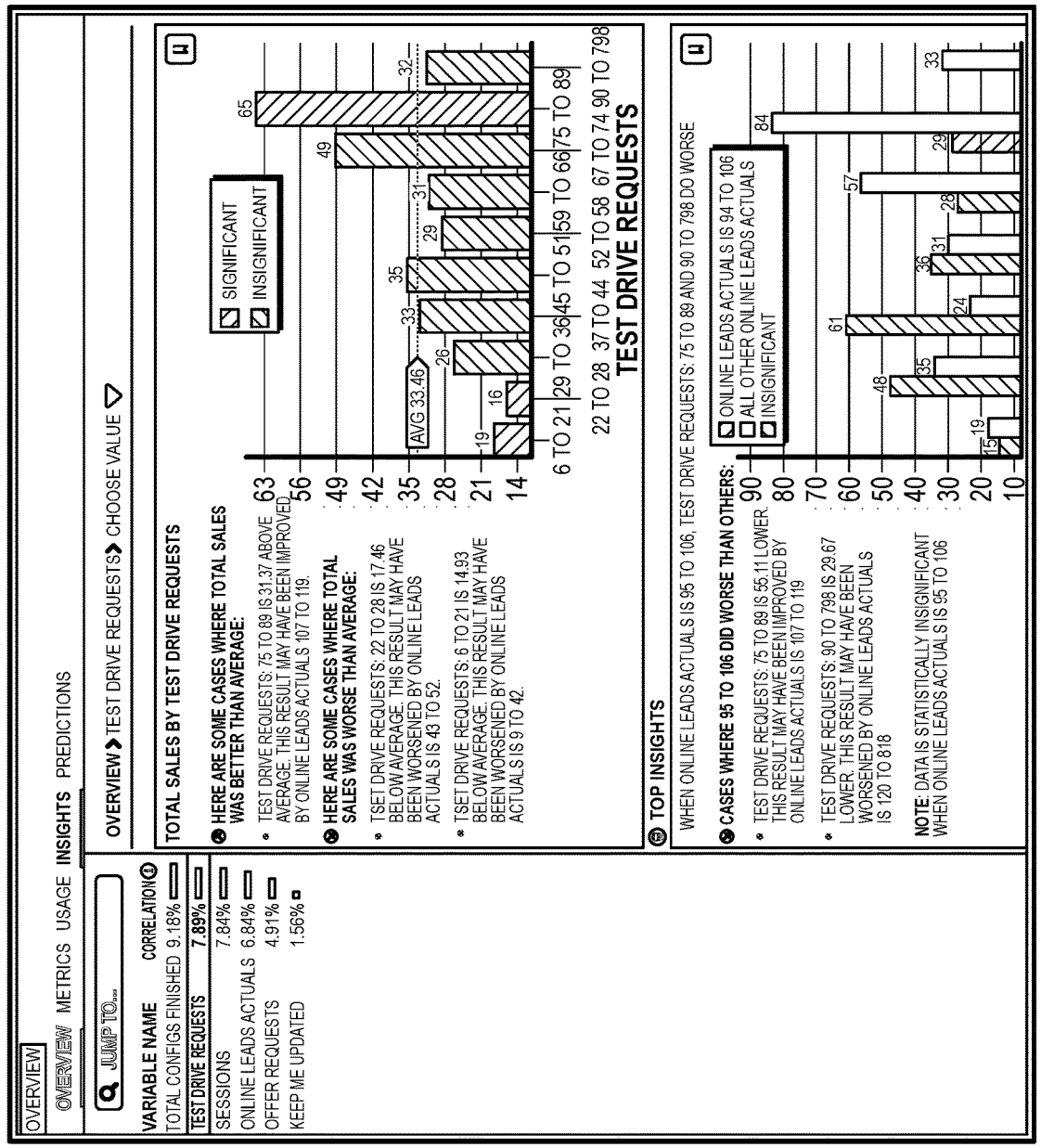
FIG. 3 is a diagram illustrating a GUI that allows a user to view data insights, according to some example implementations.

Users 170 of the data insights sharing service 120 may browse/search listings of the data insights sharing service 120 to find data insights they are interested in accessing. An example GUI 145 for browsing/searching for listings of the data insights sharing service 120 is shown in FIG. 2. If a user 170 finds data insights that the user is interested in accessing, the user 170 may submit a request to the data insights sharing service 120 to access those data insights. Responsive to receiving the request from the user 170, the data insights sharing service 120 may invoke the data insights generator 135 to generate the requested data insights. The data insights generator 135 may obtain the metadata describing the data insights (e.g., from storage 130) and generate the data insights based on the metadata without accessing the dataset that was analyzed to generate those data insights. The data insights sharing service 120 may then provide the data insights to the requesting user 170 (e.g., by displaying the data insights in a GUI 145). An example GUI 145 for displaying data insights is shown in FIG. 3.

In an implementation, the data insights sharing service 120 is gated by an authentication mechanism that requires users 170 to be authenticated by the data insights sharing service 120 before being able to access data insights shared by other users 170. In an implementation, the data insights sharing service 120 maintains access control information (e.g., in storage 130 or similar data storage) regarding which users 170 of the data insights sharing service 120 are allowed to access which data insights. The data insights sharing service 120 may access this information to determine whether a user 170 requesting to access certain data insights is allowed to access those data insights and only provide those data insights to the user 170 if the access control information indicates that the user 170 is allowed to access the data insights. In an implementation, any user 170 can browse listings of data insights without being authenticated but must be authenticated to actually access/view data insights.

In an implementation, the data insights sharing service 120 bills users for accessing data insights and/or compensates users for sharing data insights. The pricing model may be flexible. For example, the data insights sharing service 120 may bill users 170 accessing data insights using one-time fees, subscription fees, and/or per-usage fees. The data insights sharing service 120 may compensate users 170 sharing data insights according to how much revenue their data insights generated (e.g., after deducting brokerage fees). In an implementation, the data insights sharing service 120 allows users 170 sharing data insights to choose the pricing model for their data insights. In an implementation, the data insights sharing service 120 maintains billing information (e.g., in storage 130 or similar data storage) regarding which users 170 of the data insights sharing service 120 are to be billed for accessing data insights (and how much) and which users are to be compensated for sharing data insights (and how much).

In an implementation, the data insights sharing service 120 includes a data owner portal 180 that data owners can access. The data owner portal 180 may provide a data owner with a GUI to submit requests to share data insights, configure/edit the pricing model for the data insights that the data owner has shared, configure/edit the tags for the data insights (e.g., to allow other users to search for the data insights more easily), and/or perform other management functions with regard to sharing of data insights.

In the example shown in the diagram, user 170A owns a dataset (and thus user A is a data owner) and may submit a request to the data analytics service 110 to analyze the dataset. Responsive to receiving the request from user 170A, the data analytics service 110 may analyze the dataset, generate one or more data insights for the dataset based on the analysis, and provide the data insights for the dataset to user 170A (e.g., via a GUI).

User 170A may then submit a request to the data insights sharing service 120 to share the data insights for the dataset with users of the data insights sharing service 120. Responsive to receiving the request, the data insights sharing service 120 may pull the data insights from the data analytics service 110. The metadata generator 125 of the data insights sharing service 120 may obtain the data insights, generate metadata describing the data insights, and store the metadata describing the data insights in storage 130. The data insights sharing service 120 may then create a listing for the data insights shared by user 170A. Similarly, user 170B may own a dataset (and thus user B is data owner) and share data insights for the dataset in a similar manner. As a result, the data insights sharing service 120 will have a listing for the data insights shared by user 170A and a listing for the data insights shared by user 170B.

Users 170 of the data insights sharing service 120 may browse/search the listings to find data insights that they are interested in accessing (e.g., via GUI 145). If user 170C is interested in accessing the data insights shared by user 170A then user 170C may submit a request to the data insights sharing service 120 to access the data insights shared by user 170A. Responsive to receiving the request from user 170C, the data insights sharing service 120 may invoke the data insights generator 135 to generate the requested data insights. The data insights generator 135 may obtain the metadata describing the data insights (e.g., from storage 130) and generate the data insights based on the metadata without accessing the dataset that was analyzed to generate those data insights. The data insights sharing service 120 may then provide the data insights to user 170C (e.g., via GUI 145). Similarly, if user 170D is interested in accessing the data insights shared by user 170B then user 170D may submit a request to the data insights sharing service 120 to access the data insights shared by user 170B. The data insights sharing service 120 may process this request in a similar manner as described above to generate the data insights and provide the data insights to user 170D.

Sharing of Predictive Models

As mentioned above, the data analytics service 110 may generate predictive models based on analyzing datasets. In an implementation, the data insights sharing service 120 provides a service that allows users 170 to easily share predictive models with other users to allow other users to apply the predictive models to their datasets, but without exposing the predictive models themselves or the datasets that were analyzed to generate the predictive models to the other users. Once the data analytics service 110 generates a prediction model based on analyzing a dataset owned by a user 170, the user 170 may submit a request to the data insights sharing service 120 to share this predictive model with users 170 of the data insights sharing service 120. In an implementation, the request may include various user-provided information regarding the prediction model such as a brief description of the predictive model and a pricing model for the predictive model.

Responsive to receiving the request from the user 170 to share a predictive model, the data insights sharing service 120 may pull the predictive model from the data analytics service 110 (in some implementations the data analytics service 110 pushes/exports the predictive model to the data insights sharing service 120 (e.g., upon detecting that a user has submitted a request to share the predictive model)). The data insights sharing service 120 may store the predictive model in storage 130 along with any user-provided information regarding the predictive model.

The data insights sharing service 120 may then create a listing for the predictive model that can be browsed/searched by users 170 of the data insights sharing service 120. The listing may include a preview of the predictive model being shared. The preview may include various information regarding the predictive model such as the user-provided information regarding the predictive model (e.g., a brief description of the predictive model and a pricing model for the predictive model) and possibly other information regarding the predictive model. For example, the preview for the predictive model may include information regarding the input variables/columns of the predictive model (e.g., their correlations with the outcome variable/column), information regarding the machine learning algorithm used to train the predictive model, and/or information regarding the dataset that was analyzed to generate the predictive model (i.e., the training data). In an implementation, the data insights sharing service 120 creates a combined listing for data insights and a predictive model that were generated based on analyzing the same dataset.

Figure 4:
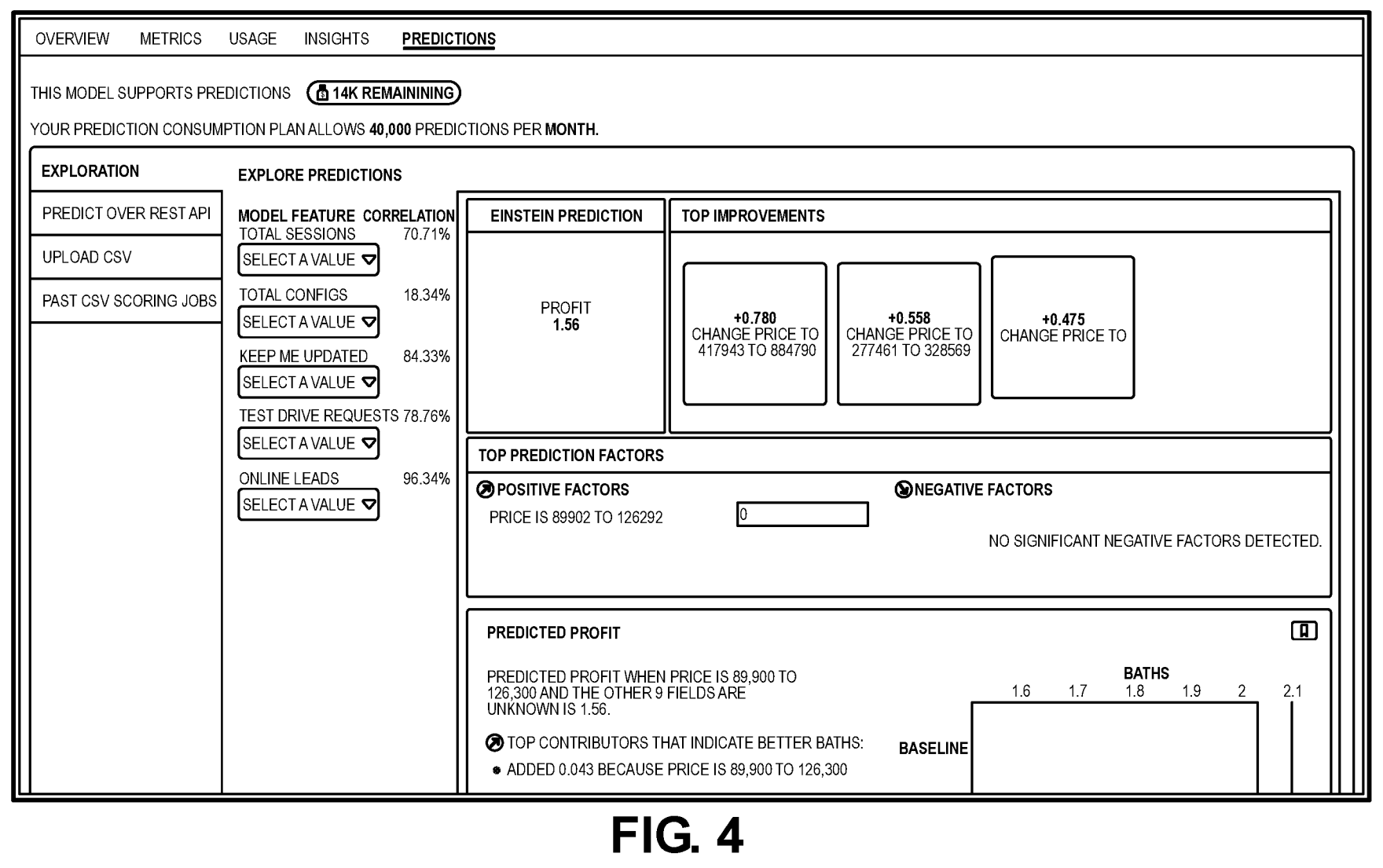
Figure 6:
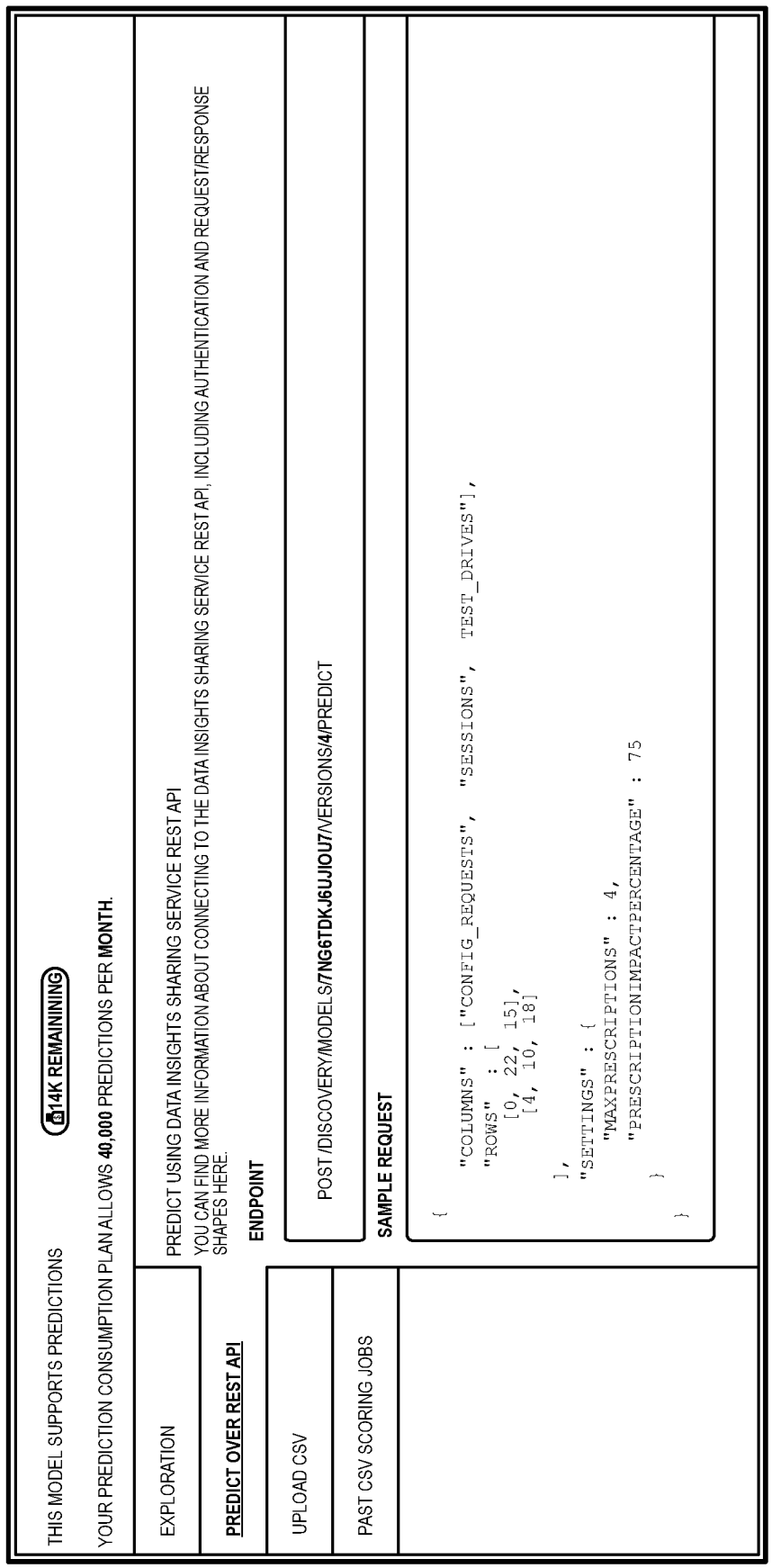
FIG. 6 is a diagram illustrating a GUI that provides information regarding how to submit a prediction request to the data insights sharing service via an application programming interface (API), according to some example implementations.

Users 170 of the data insights sharing service 120 may browse/search listings of the data insights sharing service 120 to find predictive models they wish to apply to their own datasets. If a user 170 finds a predictive model that the user 170 is interested in applying to its own dataset, the user 170 may submit a request to the data insights sharing service 120 to apply the predictive model to the dataset. The user 170 may provide the dataset to the data insights sharing service 120 via a GUI 145 or API 150 provided by the data insights sharing service 120. An example GUI 145 that allows a user 170 to provide a dataset to the data insights sharing service 120 is shown in FIG. 4 and FIG. 5 (FIG. 4 shows a GUI 145 that allows a user 170 to provide a dataset to the data insights sharing service 120 by selecting values for different input columns/variables (e.g., using drop down menus) and FIG. 5 shows a GUI 145 that allows a user to provide a dataset to the data insights sharing service 120 by uploading a comma separated value (CSV) file containing the dataset). An example API request format for providing a dataset to the data insights sharing service 120 is shown in FIG. 6. In an implementation, the API is a representational state transfer (REST) API or a simple object access protocol (SOAP) API. Responsive to receiving the request from the user 170, the data insights sharing service 120 may invoke the prediction generator 140 to apply the predictive model to the user-provided dataset to generate one or more predictions. The prediction generator 140 obtains the predictive model (e.g., from storage 130) and applies the predictive model to the user-provided dataset to generate one or more predictions. The data insights sharing service 120 may then provide the predictions to the requesting user 170. The data insights sharing service 120 may provide the predictions via a GUI 145 (e.g., the GUI shown in FIG. 4) or an API 150. In an implementation, the GUI 145 is an abstraction layer that resides on top of the API 150 (e.g., the GUI 145 provides an interface for users 170 to graphically interact with the API 150). In an implementation, the data insights sharing service 120 also provides contextual information regarding the predictions to the requesting user 170. The contextual information may include, for example, information regarding what are the biggest factors that affected the final outcomes/predictions and/or information regarding ways to improve the outcomes/predictions by changing certain variables/columns (sometimes referred to as "actionable" variables/columns).

In an implementation, the data insights sharing service 120 is gated by an authentication mechanism that requires users 170 to be authenticated by the data insights sharing service 120 before being able to apply predictive models shared by other users 170 to their own datasets. In an implementation, the data insights sharing service 120 maintains access control information (e.g., in storage 130 or similar data storage) regarding which users 170 of the data insights sharing service 120 are allowed to apply which predictive models. The data insights sharing service 120 may access this information to determine whether a user 170 requesting to apply a certain predictive model is allowed to apply that predictive model and only apply the predictive model and provide predictions to the user 170 if the access control information indicates that the user 170 is allowed to apply the predictive model. In an implementation, any user can browse listings of predictive models without being authenticated but must be authenticated to actually apply predictive models.

In an implementation, the data insights sharing service 120 bills users 170 for applying predictive models and/or compensates users 170 for sharing predictive models. The pricing model may be flexible. For example, the data insights sharing service 120 may bill users 170 using one-time fees, subscription fees, and/or per-usage fees (e.g., per prediction or computational time used). The data insights sharing service 120 may compensate users 170 sharing predictive models according to how much revenue their predictive models generated (e.g., after deducting brokerage fees). In an implementation, the data insights sharing service 120 allows users 170 sharing predictive models to choose the pricing model for their predictive models. In an implementation, the data insights sharing service 120 maintains billing information (e.g., in storage 130 or similar data storage) regarding which users 170 of the data insights sharing service 120 are to be billed for applying predictive models (and how much) and which users are to be compensated for sharing predictive models (and how much).

In an implementation, the data insights sharing service 120 allows users 170 to try out a predictive model before purchasing it. For example, the data insights sharing service 120 may allow a user 170 to apply the predictive model to a limited number of rows of a dataset to allow the user 170 to understand the predictive model better. If the user 170 wishes to apply the predictive model to additional rows of the dataset or a different dataset then the data insights sharing service 120 may require the user 170 to purchase the predictive model before doing so.

In an implementation, the data insights sharing service 120 generates usage information for a predictive model. The usage information for a predictive model may include, for example, information regarding the frequency of out of bound values for each column (data that has not been seen by the predictive model before), information regarding the frequency of missing values for each variable/column (occurrences where predictions were made not specifying a value for that variable/column), and information regarding the number of predictions for each predictive model by type (e.g., API, GUI, and CSV). The data insights sharing service 120 may provide the usage information for the predictive model to the user 170 that shared the predictive model to allow the user 170 to refine any future predictive models it shares based on the usage information.

In an implementation, the data insights sharing service 120 includes a data owner portal 180 that data owners can access. The data owner portal 180 may provide a data owner with a GUI to share predictive models, configure/edit the pricing models for the predictive models that the data owner has shared, configure/edit the tags for the predictive models (e.g., to allow other users 170 to search for the predictive models more easily), view usage information for predictive models, and/or perform other management functions with regard to sharing of predictive models.

Continuing with the example shown in the diagram, when user 170A submits a request to the data analytics service 110 to analyze its dataset, the data analytics service may generate one or more predictive models based on analyzing the dataset. Subsequently, user 170A may submit a request to the data insights sharing service 120 to share the predictive model with users 170 of the data insights sharing service 120. Responsive to receiving the request, the data insights sharing service 120 may pull the predictive model from the data analytics service 110 and store the predictive model in storage 130. The data insights sharing service 120 may then create a listing for the predictive model being shared. Similarly, user 170B may share a predictive model that was generated based on analyzing its dataset in a similar manner. As a result, the data insights sharing service 120 will have a listing for the predictive model shared by user 170A and a listing for the predictive model shared by user 170B.

Users 170 of the data insights sharing service 120 may browse/search the listings to find predictive models that they are interested in applying to their own datasets. If user 170D is interested in applying the predictive model shared by user 170A to its own dataset, then user 170D may submit a request to the data insights sharing service 120 via GUI 145 to apply the predictive model shared by user 170A to its own dataset. User 170D may provide its dataset to the data insights sharing service 120 via GUI 145, for example, by selecting values for different variables/columns or uploading a CSV file. Responsive to receiving the request, the data insights sharing service 120 may invoke the prediction generator 140 to apply the predictive model shared by user 170A to the dataset provided by user 170D to generate one or more predictions. The data insights sharing service 120 may then provide the predictions to user 170D via GUI 145. Similarly, if user 170E is interested in applying the predictive model shared by user 170B to its own dataset, then user 170E may submit a request to the data insights sharing service via API 150 to apply the predictive model shared by user 170B to its own dataset. User 170E may provide its dataset to the data insights sharing service 120 via API 150 (e.g., as part of the API request). The data insights sharing service 120 may process the request in a similar manner as described above to generate predictions (by applying the predictive model shared by user 170B to the dataset provided by user 170E) and provide the predictions to user 170E via API 150.

An advantage of implementations disclosed herein is that they can provide a platform that allows users to share data insights for their datasets with other users without exposing the datasets themselves. Users may wish to share data insights to earn sales, accountability, and/or respectability in their industries. The ability to share insights while limiting the exposure of datasets may be particularly desirable if the datasets contain potentially sensitive or proprietary data. Also, an advantage of implementations disclosed herein is that they can provide a platform that allows users to share predictive models with other users (alternatively or in addition to providing the platform that allows users to share data insights) so that other users can apply the predictive models to their own datasets, but without exposing the predictive models themselves or the dataset that was analyzed to generate those predictive models. While certain advantages are mentioned here, one of ordinary skill in the art will recognize that implementations may provide other advantages than those mentioned above.

FIG. 2 is a diagram illustrating a GUI that allows a user to browse/search listings of the data insights sharing service, according to some example implementations. As shown in the diagram, the GUI includes listings for various data insights (e.g., a listing for "Car Sales in San Francisco Bay Area" (shared by "Bay Area Ford® Dealership"), a listing for "Worldwide car sales 2010-2021" (shared by Tesla®), etc.). The GUI also includes an interface that allows the user to filter the listings based on different attributes (e.g., "Prices," "Cloud and Feature," "Data Quality," and "Other Filters"). The GUI also includes a search bar to allow the user to perform a text search for listings.

FIG. 3 is a diagram illustrating a GUI that allows a user to view data insights, according to some example implementations. As shown in the diagram, the GUI includes visual/textual representations of data insights (e.g., data insights indicating "Total Sales by Test Drive Requests" and data insights indicating "When Online Leads Actuals is 95 to 106, Test Drive Requests: 75 to 89 and 90 to 798 do worse").

FIG. 4 is a diagram illustrating a GUI that allows a user to provide a dataset to the data insights sharing service by selecting values for different columns/variables, according to some example implementations. As shown in the diagram, the GUI includes an interface that allows the user to select/ input values for different input columns/variables (e.g., "Total Sessions," Total Configs," "Keep me updated," "Test Drive Requests," and "Online Leads"). The GUI also includes an interface to indicate the prediction result (which in this example is the predicted profit in the "Einstein Prediction" box), ways to improve the outcome/prediction (in the "Top Improvements" box), and the top factors that affected the prediction (in the "Top Prediction Factors" box).

FIG. 5 is a diagram illustrating a GUI that allows a user to provide a dataset to the data insights sharing service by uploading a CSV file, according to some example implementations. As shown in the diagram, the GUI includes a button that allows a user to upload a CSV file that includes the dataset on which to apply a predictive model (the button labeled "Upload CSV"). The GUI also include a button that allows a user to make a request to the data insights sharing service 120 to apply the predictive model to the dataset included in the uploaded CSV file (the button labeled "Start Scoring" (in the machine learning context, the term "scoring" is often synonymous with "predicting")).

FIG. 6 is a diagram illustrating a GUI that provides information regarding how to submit a prediction request to the data insights sharing service via an API, according to some example implementations. As shown in the diagram, the GUI includes information regarding the endpoint for API requests and the format of API requests.

Figure 7:
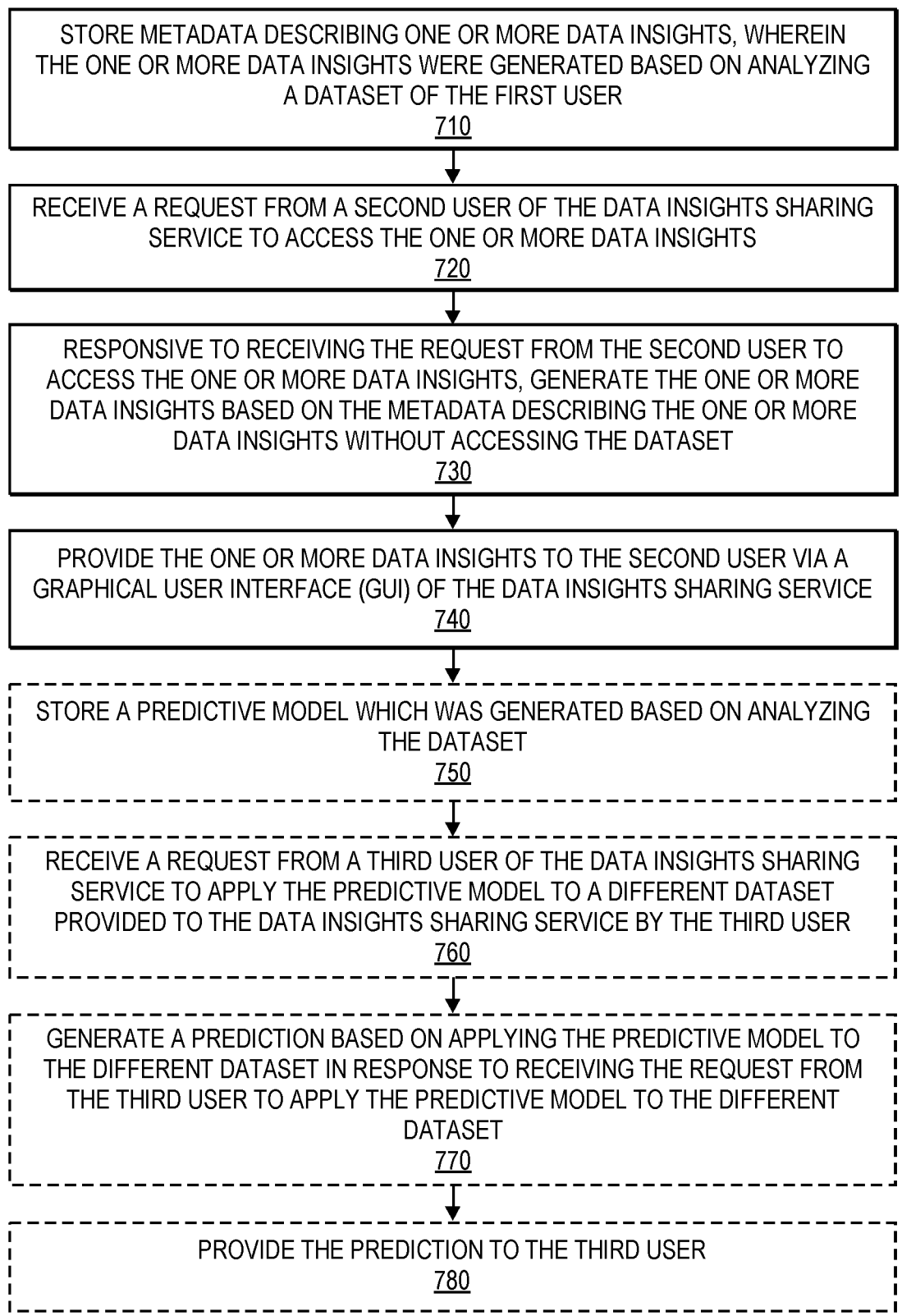
FIG. 7 is a flow diagram illustrating a process by a data insights sharing service for allowing a user of the data insights sharing service to share data insights with other users of the data insights sharing service, according to some example implementations.

FIG. 7 is a flow diagram illustrating a process by a data insights sharing service for allowing a user of the data insights sharing service to share data insights with other users of the data insights sharing service, according to some example implementations. In an implementation, the process is implemented by one or more computing devices implementing the data insights sharing service.

At block 710, the data insights sharing service stores metadata describing one or more data insights, wherein the one or more data insights were generated based on analyzing a dataset of a first user of the data insights sharing service (e.g., responsive to a request from the first user to share the data insights). In an implementation, the data insights sharing service provides a preview of the one or more data insights to users of the data insights sharing service via the GUI of the data insights sharing service, wherein the preview of the one or more data insights includes information regarding the one or more data insights but not the one or more data insights themselves.

At block 720, the data insights sharing service receives a request from a second user of the data insights sharing service to access the one or more data insights.

At block 730, responsive to receiving the request from the second user to access the one or more data insights, the data insights sharing service generates the one or more data insights based on the metadata describing the one or more data insights without accessing the dataset.

At 740, the data insights sharing service provides the one or more data insights to the second user via a GUI of the data insights sharing service. In an implementation, the data insights sharing service maintains access control information regarding which users of the data insights sharing service are allowed to access the one or more data insights and determines/confirms, based on accessing the access control information, that the second user is allowed to access the one or more data insights before providing the one or more data insights to the second user. In an implementation, the second user is billed via the data insights sharing service for accessing the one or more data insights and the first user is compensated via the data insights sharing service for sharing the one or more data insights.

In an implementation, at block 750, the data insights sharing service stores a predictive model which was generated based on analyzing the dataset (e.g., responsive to a request from the first user to share the predictive model). At block 760, the data insights sharing service receives a request from a third user of the data insights sharing service to apply the predictive model to a different dataset provided to the data insights sharing service by the third user. At block 770, the data insights sharing service generates a prediction based on applying the predictive model to the different dataset in response to receiving the request from the third user to apply the predictive model to the different dataset. At block 780, the data insights sharing service provides the prediction to the third user. In an implementation, the prediction is provided to the third user via the GUI of the data insights sharing service. In an implementation, the prediction is provided to the third user along with contextual information regarding the prediction (e.g., information regarding what are the biggest factors that affected the final outcomes/predictions and/or information regarding ways to improve the outcomes/predictions by changing certain variables/columns) In an implementation, the third user provides the different dataset to the data insights sharing service via the GUI of the data insights sharing service. In an implementation, the prediction is provided to the third user via an API provided by the data insights sharing service. In an implementation, the data insights sharing service maintains access control information regarding which users of the data insights sharing service are allowed to apply the predictive model and determines/confirms, based on accessing the access control information, that the third user is allowed to apply the predictive model before providing the prediction to the third user. In an implementation, the third user is billed via the data insights sharing service for applying the predictive model and the first user is compensated via the data insights sharing service for sharing the predictive model. In an implementation, the data insights sharing service generates usage information for the predictive model and provides the usage information for the predictive model to the first user via the GUI of the data insights sharing service to allow the first user to refine future predictive models based on the usage information for the predictive model.

In the flow diagram, blocks 710-740 represent operations for sharing data insights and blocks 750-780 represent operations for sharing a predictive model. While the flow diagram shows blocks 750-780 as sequentially following blocks 710-740, this should not be understood to mean that blocks 750-780 is dependent upon blocks 710-740. That is, some implementations may reverse the order of operations (e.g., share the predictive model first and then share the data insights), only share the data insights (without sharing the predictive model), or only share the predictive model (without sharing the data insights).

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 8A:
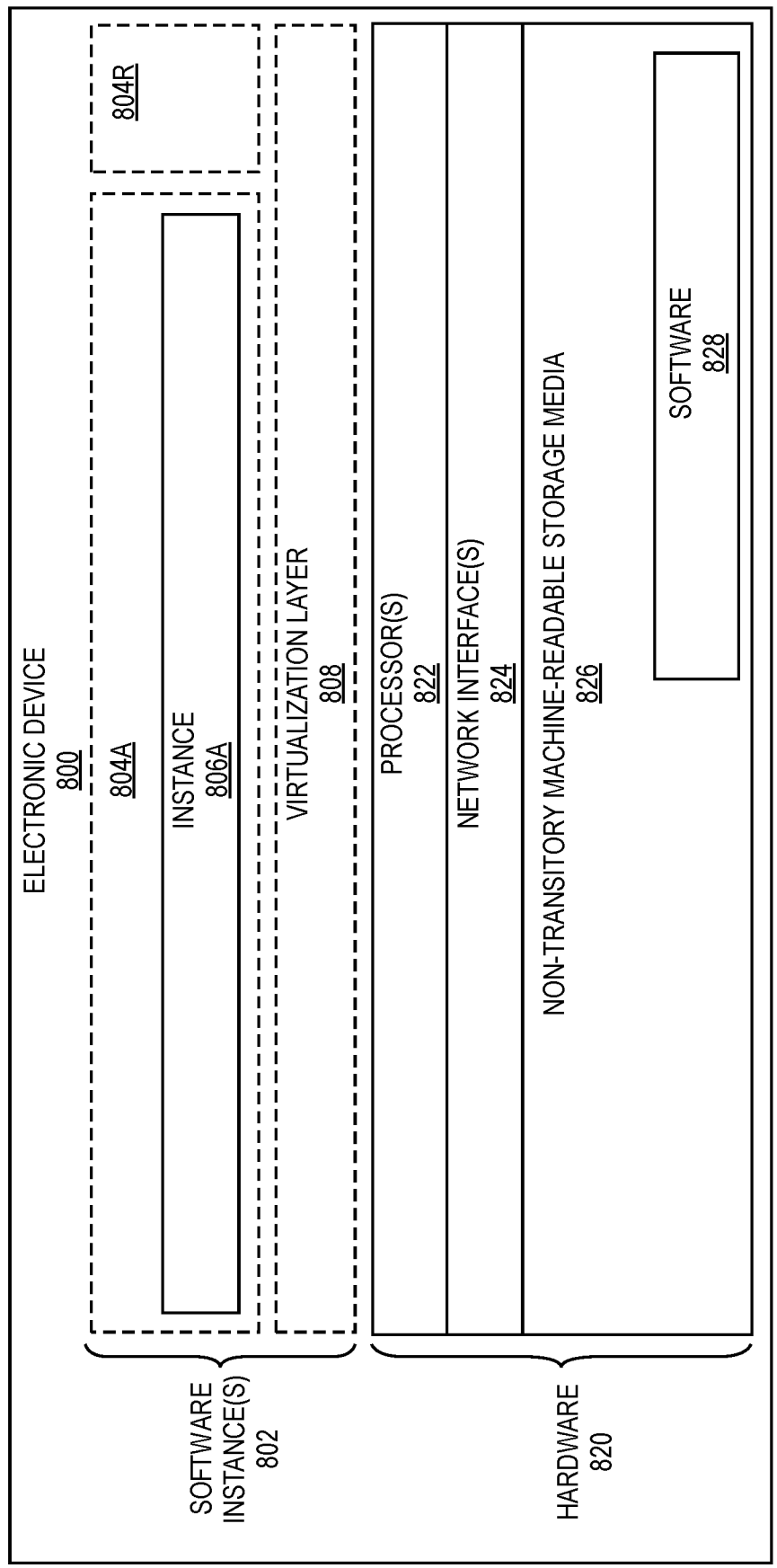
FIG. 8A is a block diagram illustrating an electronic device according to some example implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and machine-readable media 826 having stored therein software 828 (which includes instructions executable by the set of one or more processor(s) 822). The machine-readable media 826 may include non-transitory and/or transitory machine-readable medium/media. Each of the previously described clients and the data insights sharing service may be implemented in one or more electronic devices 800. In one implementation: 1) each of the clients is implemented in a separate one of the electronic devices 800 (e.g., in end user devices where the software 828 represents the software to implement clients to interface directly and/or indirectly with the data insights sharing service (e.g., software 828 represents a web browser, a native client, a portal, a command-line interface, and/or an application programming interface (API) based upon protocols such as Simple Object Access Protocol (SOAP), Representational State Transfer (REST), etc.)); 2) the data insights sharing service is implemented in a separate set of one or more of the electronic devices 800 (e.g., a set of one or more server devices where the software 828 represents the software to implement the data insights sharing service); and 3) in operation, the electronic devices implementing the clients and the data insights sharing service would be communicatively coupled (e.g., by a network) and would establish between them (or through one or more other layers and/or or other services) connections for submitting requests to the data insights sharing service (e.g., to share data insights, share predictive models, access data insights, and/or apply predictive models) and returning response (e.g., an acknowledgement that the data insights and/or predictive models have been shared or actual data insights and/or predictions) to the clients. Other configurations of electronic devices may be used in other implementations (e.g., an implementation in which the client and the data insights sharing service are implemented on a single one of electronic device 800).

During operation, an instance of the software 828 (illustrated as instance 806 and referred to as a software instance; and in the more specific case of an application, as an application instance) is executed. In electronic devices that use compute virtualization, the set of one or more processor(s) 822 typically execute software to instantiate a virtualization layer 808 and one or more software container(s) 804A-804R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-804R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 828 is executed within the software container 804A on the virtualization layer 808. In electronic devices where compute virtualization is not used, the instance 806 on top of a host operating system is executed on the "bare metal" electronic device 800. The instantiation of the instance 806, as well as the virtualization layer 808 and software containers 804A-804R if implemented, are collectively referred to as software instance(s) 802.

Alternative implementations of an electronic device may have numerous variations from that described above. For example, customized hardware and/or accelerators might also be used in an electronic device.

Example Environment

Figure 8B:
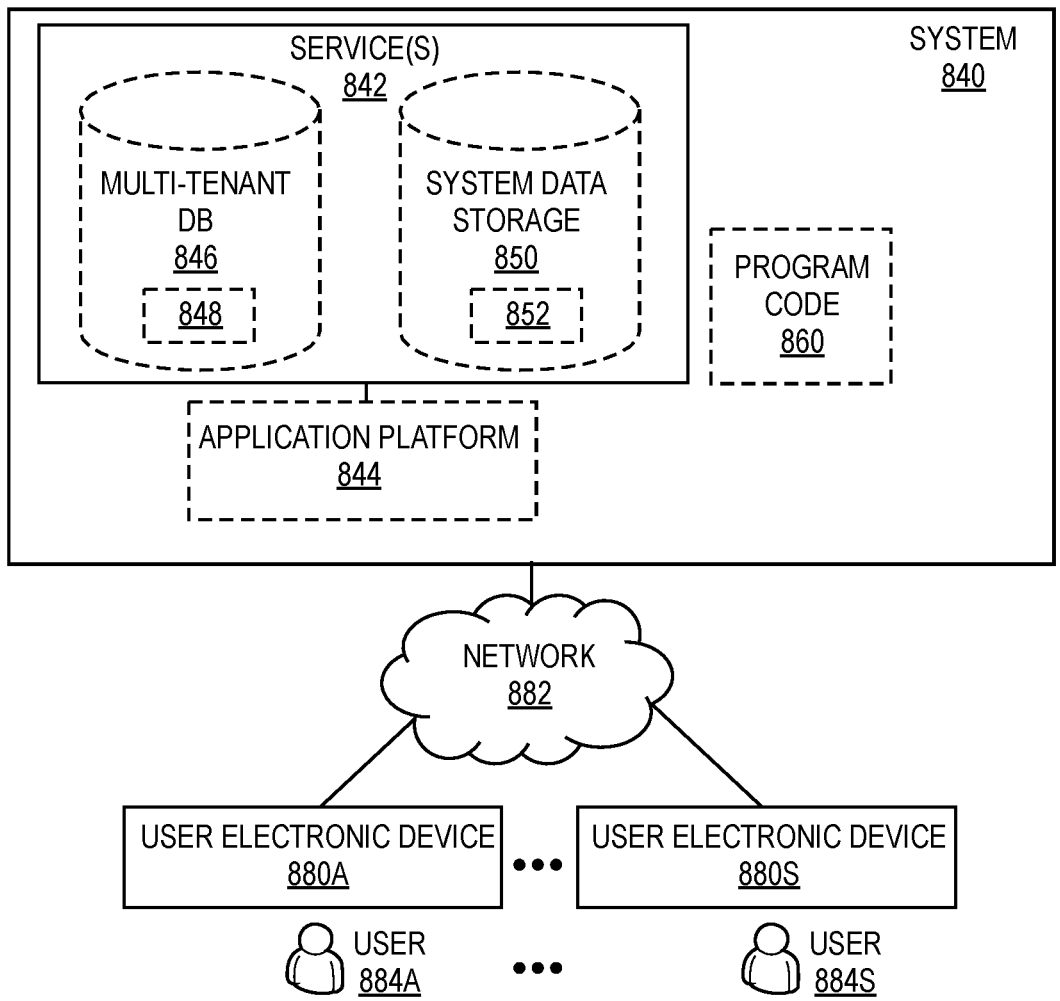
FIG. 8B is a block diagram of a deployment environment according to some example implementations.

FIG. 8B is a block diagram of a deployment environment according to some example implementations. A system 840 includes hardware (e.g., a set of one or more server devices) and software to provide service(s) 842, including the data insights sharing service. In some implementations the system 840 is in one or more datacenter(s). These datacenter(s) may be: 1) first party datacenter(s), which are datacenter(s) owned and/or operated by the same entity that provides and/or operates some or all of the software that provides the service(s) 842; and/or 2) third-party datacenter(s), which are datacenter(s) owned and/or operated by one or more different entities than the entity that provides the service(s) 842 (e.g., the different entities may host some or all of the software provided and/or operated by the entity that provides the service(s) 842). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 840 is coupled to user devices 880A-880S over a network 882. The service(s) 842 may be on-demand services that are made available to one or more of the users 884A-884S working for one or more entities other than the entity which owns and/or operates the on-demand services (those users sometimes referred to as outside users) so that those entities need not be concerned with building and/or maintaining a system, but instead may make use of the service(s) 842 when needed (e.g., when needed by the users 884A-884S). The service(s) 842 may communicate with each other and/or with one or more of the user devices 880A-880S via one or more APIs (e.g., a REST API). In some implementations, the user devices 880A-880S are operated by users 884A-884S, and each may be operated as a client device and/or a server device. In some implementations, one or more of the user devices 880A-880S are separate ones of the electronic device 800 or include one or more features of the electronic device 800.

In some implementations, the system 840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 840 is a multi-tenant cloud computing architecture supporting multiple services, such as one or more of the following types of services: data insights sharing service 842, data analytics service, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 840 may include an application platform 844 that enables PAAS for creating, managing, and executing one or more applications developed by the provider of the application platform 844, users accessing the system 840 via one or more of user devices 880A-880S, or third-party application developers accessing the system 840 via one or more of user devices 880A-880S.

In some implementations, one or more of the service(s) 842 may use one or more multi-tenant databases 846, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user devices 880A-880S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the multi-tenant database(s) 846 and/or system data storage 850.

In some implementations, the service(s) 842 are implemented using virtual applications dynamically created at run time responsive to queries from the user devices 880A-880S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the data insights sharing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 840 and the user devices 880A-880S.

Each user device 880A-880S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, and to perform searches on stored data, and otherwise allow one or more of users 884A-884S to interact with various GUI pages that may be presented to the one or more of users 884A-884S. User devices 880A-880S might communicate with system 840 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 880A-880S might include an HTTP client, commonly referred to as a "browser," for sending and receiving HTTP messages to and from server(s) of system 840, thus allowing users 884A-884S of the user devices 880A-880S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method by one or more computing devices implementing a data insights sharing service to allow a first user of the data insights sharing service to share data insights with other users of the data insights sharing service, the method comprising:
storing metadata describing one or more data insights, wherein the one or more data insights were generated by a data analytics service based on analyzing a dataset of the first user, the data analytics service being a separate service from the data insights sharing service and having access to the dataset, but the data insights sharing service not having access to the dataset;
receiving a request from a second user of the data insights sharing service to access the one or more data insights;
responsive to receiving the request from the second user to access the one or more data insights, generating the one or more data insights based on the metadata describing the one or more data insights without the data insights sharing service accessing the dataset that was analyzed by the data analytics service to generate the one or more data insights; and
providing the one or more data insights to the second user via a graphical user interface (GUI) of the data insights sharing service.

2. The method of claim 1, further comprising:
providing a preview of the one or more data insights to users of the data insights sharing service via the GUI of the data insights sharing service, wherein the preview of the one or more data insights includes information regarding the one or more data insights but not the one or more data insights themselves.

3. The method of claim 1, further comprising:
maintaining access control information regarding which users of the data insights sharing service are allowed to access the one or more data insights; and
determining, based on accessing the access control information, that the second user is allowed to access the one or more data insights before providing the one or more data insights to the second user.

4. The method of claim 3, wherein the second user is billed via the data insights sharing service for accessing the one or more data insights and the first user is compensated via the data insights sharing service for sharing the one or more data insights.

5. The method of claim 1, further comprising:
storing a predictive model which was generated based on analyzing the dataset;
receiving a request from a third user of the data insights sharing service to apply the predictive model to a different dataset provided to the data insights sharing service by the third user;
generating a prediction based on applying the predictive model to the different dataset in response to receiving the request from the third user to apply the predictive model to the different dataset; and
providing the prediction to the third user.

6. The method of claim 5, wherein the prediction is provided to the third user via the GUI of the data insights sharing service.

7. The method of claim 6, wherein the third user provides the different dataset to the data insights sharing service via the GUI of the data insights sharing service.

8. The method of claim 5, wherein the prediction is provided to the third user via an application programming interface (API) provided by the data insights sharing service.

9. The method of claim 5, further comprising:
maintaining access control information regarding which users of the data insights sharing service are allowed to apply the predictive model; and
determining, based on accessing the access control information, that the third user is allowed to apply the predictive model before providing the prediction to the third user.

10. The method of claim 9, wherein the third user is billed via the data insights sharing service for applying the predictive model and the first user is compensated via the data insights sharing service for sharing the predictive model.

11. The method of claim 5, further comprising:
generating usage information for the predictive model; and
providing the usage information for the predictive model to the first user via the GUI of the data insights sharing service to allow the first user to refine future predictive models based on the usage information for the predictive model.

12. The method of claim 5, wherein the prediction is provided to the third user along with contextual information regarding the prediction.

13. A non-transitory machine-readable storage medium that provides instructions that, if executed by a set of one or more processors of one or more computing devices implementing a data insights sharing service, causes the one or more computing devices to perform operations for allowing a first user of the data insights sharing service to share data insights with other users of the data insights sharing service, the operations comprising:

storing metadata describing one or more data insights, wherein the one or more data insights were generated by a data analytics service based on analyzing a dataset of the first user, the data analytics service being a separate service from the data insights sharing service and having access to the dataset, but the data insights sharing service not having access to the dataset;
   receiving a request from a second user of the data insights sharing service to access the one or more data insights;
   responsive to receiving the request from the second user to access the one or more data insights, generating the one or more data insights based on the metadata describing the one or more data insights without the data insights sharing service accessing the dataset that was analyzed by the data analytics service to generate the one or more data insights; and
   providing the one or more data insights to the second user via a graphical user interface (GUI) of the data insights sharing service.

14. The non-transitory machine-readable storage medium of claim 13, wherein the operations further comprise:
   storing a predictive model which was generated based on analyzing the dataset;
   receiving a request from a third user of the data insights sharing service to apply the predictive model to a different dataset provided to the data insights sharing service by the third user;
   generating a prediction based on applying the predictive model to the different dataset in response to receiving the request from the third user to apply the predictive model to the different dataset; and
   providing the prediction to the third user.

15. The non-transitory machine-readable storage medium of claim 14, wherein the prediction is provided to the third user via the GUI of the data insights sharing service.

16. The non-transitory machine-readable storage medium of claim 14, wherein the prediction is provided to the third user via an application programming interface (API) provided by the data insights sharing service.

17. An apparatus to implement a data insights sharing service that allows a first user of the data insights sharing service to share data insights with other users of the data insights sharing service, the apparatus comprising:
   a set of one or more processors; and
   a non-transitory machine-readable storage medium that provides instructions that, if executed by the set of one or more processors, causes the apparatus to:
      store metadata describing one or more data insights, wherein the one or more data insights were generated by a data analytics service based on analyzing a dataset of the first user, the data analytics service being a separate service from the data insights sharing service and having access to the dataset, but the data insights sharing service not having access to the dataset,
      receive a request from a second user of the data insights sharing service to access the one or more data insights,
      responsive to receiving the request from the second user to access the one or more data insights, generate the one or more data insights based on the metadata describing the one or more data insights without the data insights sharing service accessing the dataset that was analyzed by the data analytics service to generate the one or more data insights, and
      provide the one or more data insights to the second user via a graphical user interface (GUI) of the data insights sharing service.

18. The apparatus of claim 17, wherein the instructions, if executed by the set of one or more processors, further causes the apparatus to:
   store a predictive model which was generated based on analyzing the dataset,
   receive a request from a third user of the data insights sharing service to apply the predictive model to a different dataset provided to the data insights sharing service by the third user,
   generate a prediction based on applying the predictive model to the different dataset in response to receiving the request from the third user to apply the predictive model to the different dataset, and
   provide the prediction to the third user.

19. The apparatus of claim 18, wherein the prediction is provided to the third user via the GUI of the data insights sharing service.

20. The apparatus of claim 18, wherein the prediction is provided to the third user via an application programming interface (API) provided by the data insights sharing service.

* * * * *